(12) United States Patent
Labrie et al.

(10) Patent No.: US 6,655,711 B1
(45) Date of Patent: Dec. 2, 2003

(54) AIR BAG COVER ASSEMBLY

(75) Inventors: Craig B. Labrie, Dover, NH (US); John D. Gray, Union, NH (US)

(73) Assignee: Textron Automotive Company, Inc., Troy, MI (US)

( * ) Notice: Subject to any disclaimer, the term of this patent is extended or adjusted under 35 U.S.C. 154(b) by 0 days.

(21) Appl. No.: 09/699,263

(22) Filed: Oct. 27, 2000

(51) Int. Cl.⁷ ................................................ B60R 21/20
(52) U.S. Cl. ........................ 280/728.3; 280/730.2; 280/732
(58) Field of Search ............................. 280/728.3, 732, 280/730.2

(56) References Cited

U.S. PATENT DOCUMENTS

| | | | |
|---|---|---|---|
| 2,818,933 A | 1/1958 | Tell ............................. 180/90 |
| 3,817,552 A | 6/1974 | Knight, IV et al. ......... 280/150 |
| 5,066,037 A | 11/1991 | Castrigno et al. ........... 280/732 |
| 5,082,310 A | 1/1992 | Bauer ......................... 280/732 |
| 5,333,901 A | 8/1994 | Barnes ........................ 280/732 |
| 5,335,935 A | * | 8/1994 | Proos et al. ............. 280/728.3 |
| 5,431,435 A | 7/1995 | Wilson .................... 280/728.3 |
| 5,542,696 A | * | 8/1996 | Steffens et al. .......... 280/730.1 |
| 5,603,524 A | 2/1997 | Barnes et al. ............. 280/728.2 |
| 5,647,608 A | * | 7/1997 | Damman et al. ........ 280/728.2 |
| 5,755,460 A | 5/1998 | Barnes et al. ............. 280/728.3 |
| 5,783,016 A | 7/1998 | Gallagher et al. .......... 156/214 |
| 5,967,546 A | * | 10/1999 | Homier et al. ........... 280/730.2 |
| 6,254,122 B1 | * | 7/2001 | Wu et al. ................. 280/728.3 |

\* cited by examiner

*Primary Examiner*—Paul N. Dickson
*Assistant Examiner*—Deanna Draper
(74) *Attorney, Agent, or Firm*—Grossman, Tucker, Perreault & Pfleger, PLLC

(57) ABSTRACT

An air bag cover assembly is provided comprising a retainer panel having an aperture during the deployment of an inflatable air bag for the airbag to pass through. The aperture has a cross-sectional area during air bag inflation greater than the cross-sectional area of the aperture when the air bag is deflated after being inflated. A method of providing an air bag deployment aperture for an air bag cover assembly is also provided. The method comprises providing a retainer panel, forming an aperture in the retainer panel for the deployment of an inflating air bag from an air bag module, increasing the cross-sectional area of the aperture during inflation of the air bag, and decreasing the cross-sectional area of the aperture after the air bag has at least partially passed through the aperture.

37 Claims, 9 Drawing Sheets

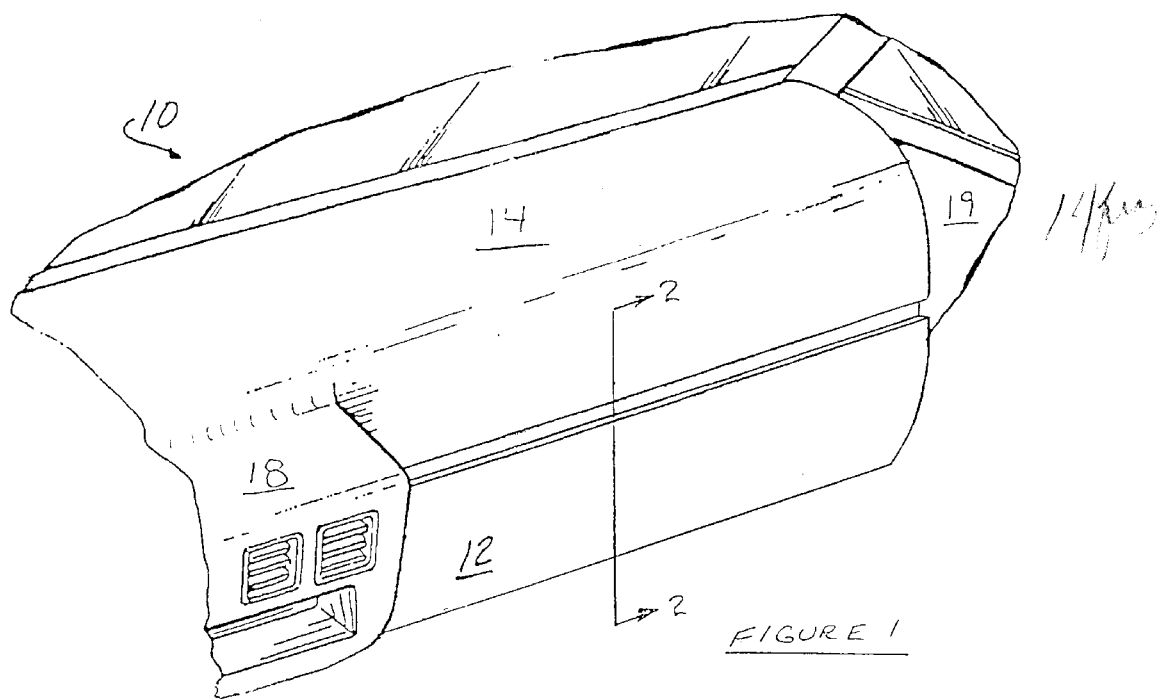

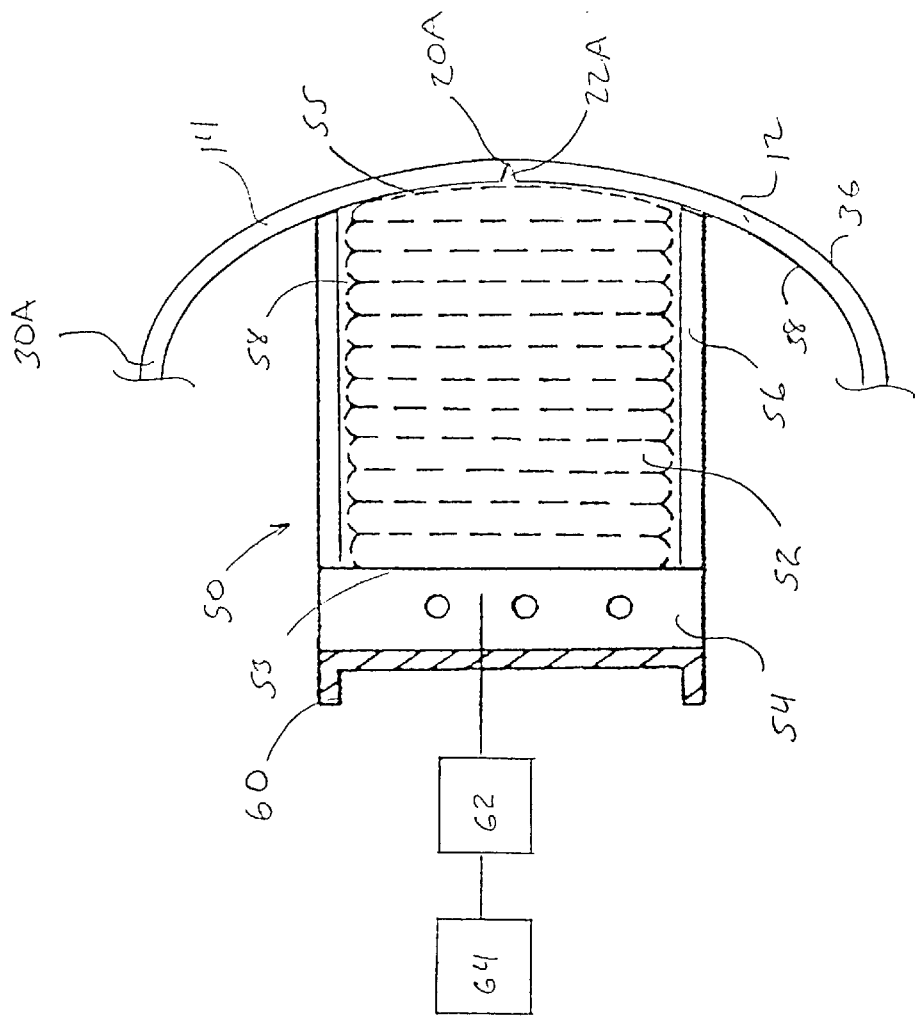

AIR BAG COVER ASSEMBLY

FIELD OF THE INVENTION

This invention relates to an air bag cover assembly for concealing an air bag and, more particularly, to the retainer panel of air bag cover assembly having an air bag deployment aperture which changes in size during the various stages of air bag deployment.

BACKGROUND OF THE INVENTION

It is known in motor vehicles to provide an inflatable air bag that deploys into the occupant compartment to cushion the occupant in the event of a serious crash. Such air bag systems typically include a driver air bag module mounted in the steering wheel and a passenger air bag module mounted in the instrument panel structure forward of the passenger seating position.

In mounting the passenger air bag module in the instrument panel structure it is known to provide one or more air bag deployment doors which cover the air bag deployment opening prior to air bag deployment. Often the deployment opening is formed in the instrument panel cover assembly and is covered by a totally separate air bag door that is attached to the instrument panel structure by a hinge. However, due to the separate air bag deployment door, these systems are costly.

U.S. Pat. No. 5,333,901, to William J. Barnes of General Motors Corporation, provides an instrument panel cover assembly in which the rearward (in car) portion thereof is detachably connected to the remainder of the instrument panel structure. Upon air bag deployment, the instrument panel cover assembly pivots upwardly to provide an air bag deployment opening and thus avoids the cost of a separately attached air bag deployment door.

Similar to the '901 Patent, U.S. Pat. No. 5,755,460 also to William J. Barnes of General Motors Corporation provides an instrument panel cover assembly in which the rearward (in car) portion thereof is detachably connected to the remainder of the instrument panel structure. However, the instrument panel cover assembly also has a weakened tear seam which originates at the rearward most edge of the cover, at a point between the driver and the passenger and proceeds from the rearward edge in a generally forward direction. Upon inflation of the air bag, the passenger-side of the instrument panel cover assembly is forcibly lifted and pivoted upwardly as permitted by detachment of detachable fasteners and the tearing of the instrument panel cover assembly along the weakened tear seam.

While the '901 and '460 Patents provide an instrument panel cover assembly without a separately attached air bag deployment door, both instrument panel cover assemblies still require the additional hardware of a separately attached hinge bracket to retain the instrument panel cover assembly to the remainder of the instrument panel structure. Furthermore, "tuning" the detachable fasteners to release at a predetermined force is difficult and time consuming. Finally, if the detachable fasteners do not open due to improper fit between the parts or misalignment of the separate parts during the assembly process, the air bag may not deploy properly.

In addition to often providing an air bag deployment opening, the instrument panel cover assembly must provide the passenger-side occupant with a level of head impact protection in the event that the passenger-side occupant's head strikes the instrument panel cover assembly. This is made more difficult after air bag deployment. After air bag deployment, the air bag deployment opening may remain opened, or only partially covered by the air bag deployment door, or the air bag deployment door may be deformed and positioned such that internal components of the air bag module (e.g. air bag canister housing) may be subsequently impacted by the passenger-side occupant. Consequently, in the event of a second vehicle impact after air bag deployment, the passenger-side occupant's head may be capable of striking the internal components of the air bag module which are ordinarily concealed prior to air bag deployment.

What is needed is an instrument panel cover assembly providing an air bag deployment aperture that does not require covering by a separately attached air bag deployment door. What is also needed is an instrument panel cover assembly which does not require complicated hardware and offers a more simplistic design. What is also needed is an instrument panel cover assembly providing an air bag deployment aperture which sufficiently closes after air bag deployment to protect the passenger-side occupant from striking the internal components of the air bag module after air bag deployment in response to a second vehicle impact.

SUMMARY OF THE INVENTION

According to one aspect of the invention, an air bag cover assembly is provided comprising a retainer panel having an aperture during the deployment of an inflatable air bag for the airbag to pass through. The aperture has a cross-sectional area during air bag inflation greater than the cross-sectional area of the aperture when the air bag is deflated after being inflated.

According to another aspect of the invention, the retainer panel may be for an instrument panel cover assembly.

According to another aspect of the invention, the retainer panel may comprise a polymer material, and may further comprise a composition of polycarbonate and acrylonitrile-butadiene-styrene. According to another aspect of the invention, the polymer material may have a flexural modulus at 73° Fahrenheit of at least 150,000 psi.

According to another aspect of the invention, the aperture may comprise an oval shape, and may further comprise an elliptical shape.

According to another aspect of the invention, the aperture may form along an air bag escape seam formed in the retainer panel. The air bag escape seam may be frangible. The air bag escape seam may also comprise at least one through-hole in the retainer panel, and the through-hole may comprise a slot shape According to another aspect of the invention, the air bag escape seam formed in the retainer panel comprises a single line which may be straight or may be curved.

According to another aspect of the invention, the air bag escape seam formed in the retainer panel may comprise an area of reduced thickness in the retainer panel. The area of reduced thickness in the retainer panel may be formed adjacent a notch in the retainer panel, and the notch may comprise a V-shape.

According to another aspect of the invention, the air bag escape seam formed in the retainer panel may be obscured from view to vehicle occupants.

According to another aspect of the invention, the air bag escape seam formed in the retainer panel may extend substantially horizontally or substantially vertically across the retainer panel.

According to another aspect of the invention, at least a portion of the retainer panel may be covered by a foam material, and at least a portion of the foam is covered by a flexible cover layer.

According to another aspect of the invention, the retainer panel may comprise first and second portions adjacent the air bag escape seam. The first and second portions of the retainer panel adjacent the air bag escape seam may separate along the seam when the retainer panel is impacted by the inflating air bag to increase the cross-sectional area of the aperture during inflation of the air bag and thereafter close to at least partially decrease the cross-sectional area of the aperture after the air bag has at least partially passed through the aperture.

According to another aspect of the invention, a method of providing an air bag deployment aperture for an air bag cover assembly comprises providing a retainer panel, forming an aperture in the retainer panel for the deployment of an inflating air bag from an air bag module, increasing the cross-sectional area of the aperture during inflation of the air bag, and decreasing the cross-sectional area of the aperture after the air bag has at least partially passed through the aperture.

According to another aspect of the method of providing an air bag deployment aperture for an air bag cover assembly, the step of increasing the cross-sectional area of the aperture during inflation of the air bag also includes uncovering at least a portion of the air bag module, and the step of decreasing the cross-sectional area of the aperture after the air bag has at least partially passed through the aperture includes covering an uncovered portion of the air bag module with the retainer panel.

According to another aspect of the method of providing an air bag deployment aperture for an air bag cover assembly, the retainer panel comprises first and second portions adjacent an air bag escape seam, and the step of increasing the cross-sectional area of the aperture during inflation of the air bag includes separating the first and second portions of the retainer panel along the seam, and the step of decreasing the cross-sectional area of the aperture after the air bag has at least partially passed through the aperture includes closing the first and second portions of the retainer panel.

BRIEF DESCRIPTION OF THE DRAWINGS

These and other objects, features and advantages of the invention will become apparent upon consideration of the description of the invention and the appended drawings in which.

The above and other objects, feature, and advantages of the present invention will be apparent in the following detailed description thereof when read in conjunction with the appended drawings wherein the same reference characters denote the same or similar parts throughout the several views.

DESCRIPTION OF THE INVENTION

Figure 2:
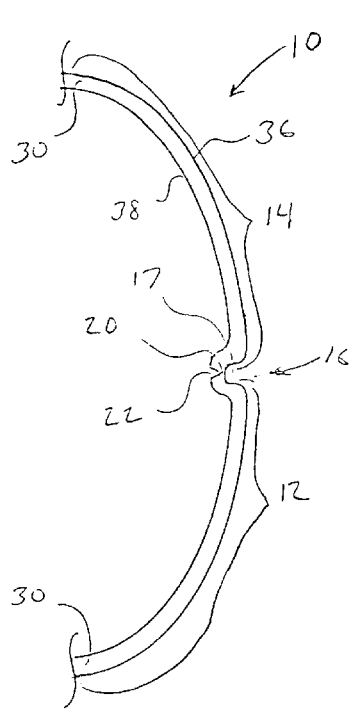
FIGS. 2, 2A, and 2B are representative profile views of several exemplary embodiments of the instrument panel cover assembly of FIG. 1 taken along section line 2—2 of FIG. 1.

For elements common to the various embodiments of the invention, the numerical reference character between the embodiments is held constant, but distinguished by the addition of an alphanumeric character to the existing numerical reference character. In other words, for example, an element referenced at 10 in the first embodiment is correspondingly referenced at 10A, 10B, and so forth in subsequent embodiments. Thus, where an embodiment description uses a reference character to refer to an element, the reference character applies equally, as distinguished by alphanumeric character, to the other embodiments where the element is common.

Figure 1:
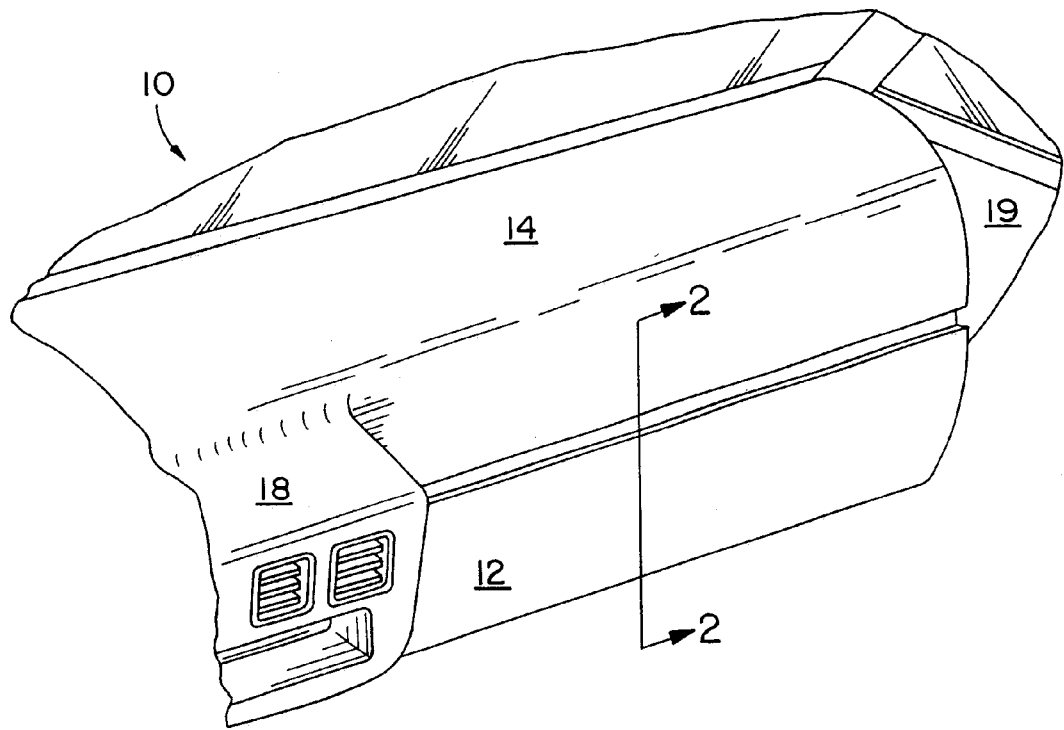
FIG. 1 is a representative perspective view of an exemplary instrument panel cover assembly in its installed position.
Figure 2:
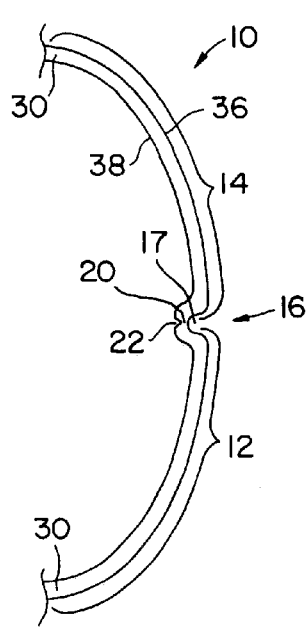
Figure 2A:
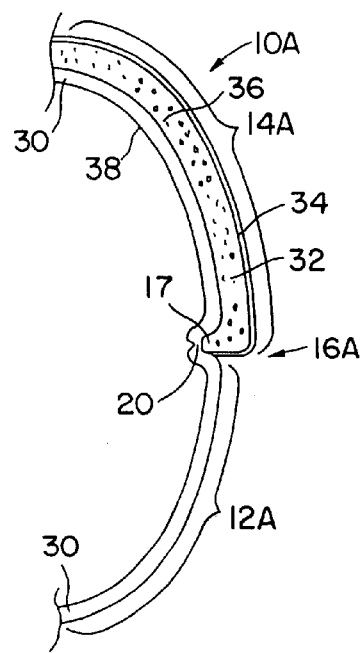
Figure 2B:
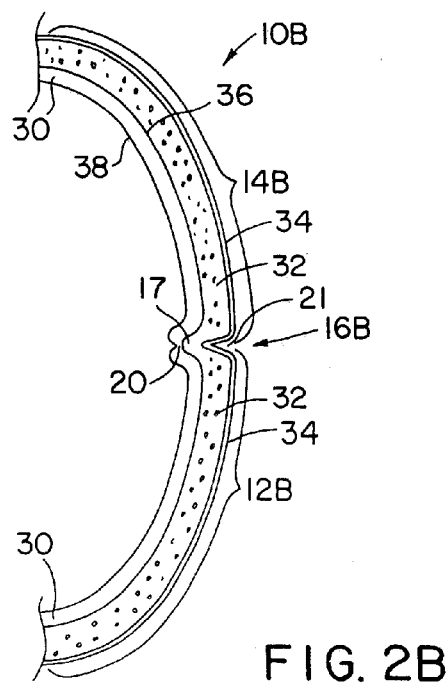
Figure 3A:
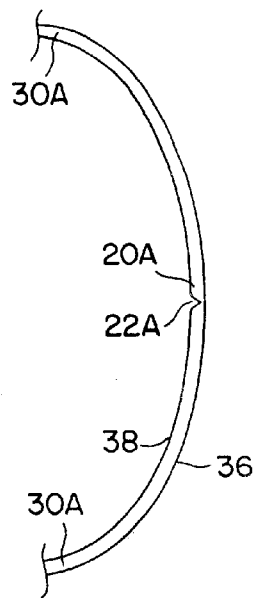
Figure 3B:
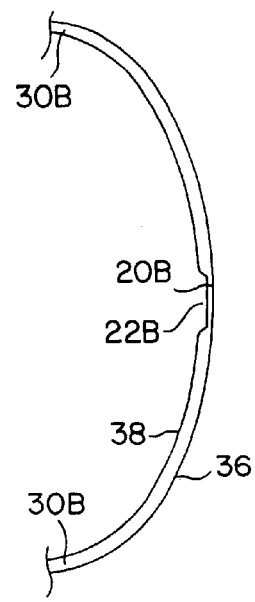
Figure 3C:
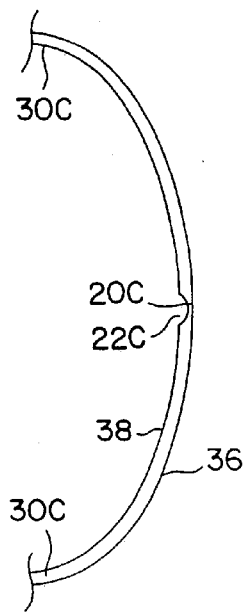
Figure 3D:
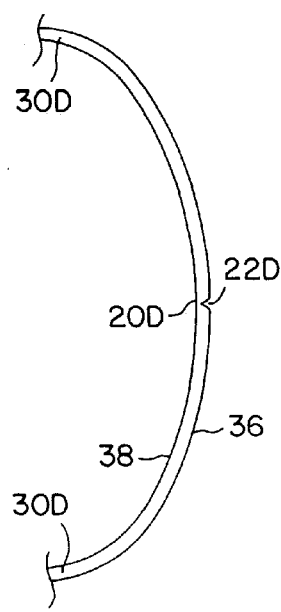

FIG. 1 illustrates an exemplary vehicle trim member and, more particularly, a section of an interior trim panel in the form of a passenger-side portion of an instrument panel cover assembly 10. While the trim member illustrated is that of an instrument panel cover assembly 10, other suitable trim members for the invention include, but are not limited to, side-trim panels (e.g. door trim panels, quarter trim panels), headliner panels, consoles (e.g. overhead, center floor mount), package shelf panels, close-out panels, pillar panels, and seats.

As shown in FIG. 2, exemplary instrument panel cover assembly 10 comprises a retainer panel 30 including an air bag escape seam 20 formed therein. Seam 20 extends across the width of the vehicle and preferably does not intersect or require engagement with a corresponding vertical line of weakening in the instrument panel. In addition, those skilled in the art will recognize that escape seam 20 may be vertically disposed, in which case it would similarly not intersect with or engage with a corresponding side-to-side line of weakening. Stated another way the aperture opening formed from seam 20 extending across the width of the vehicle is due primarily to deformation only of seam 20, such deformation causing an opening for the air bag to escape.

As explained more fully below, in response to air bag deployment, adjacent portions of the retainer panel 30 separated by the seam 20 separate along the seam 20 (and into two portions where air bag escape seam 20 is frangible) to provide an air bag deployment aperture 66 through which an air bag 52 may deploy from beneath the retainer panel 30. In this manner, instrument panel cover assembly 10 also functions as an air bag cover assembly.

Preferably, the seam 20 is substantially horizontal and extends cross-car (i.e. across the width of the vehicle from side-to-side) as discussed above and as shown in FIG. 1. In this manner, upon air bag deployment, the instrument panel cover assembly 10 separates into an upper portion 14 and a lower portion 12. As shown, the seam 20 preferably extends cross-car from about the center console 18 of the instrument panel cover assembly 10 to about the passenger-side door 19 of the vehicle in front of the front-seat passenger-side occupant. In this manner, the length of the seam preferably may be between about 18 inches to about 28 inches. However the length of the seam 20 may be shorter. Also as shown, seam 20 preferably comprises a single line. The line for seam 20 may be straight or curved. Where the line for seam 20 is curved, it preferably comprises obtuse corners and more preferably obtuse corners of greater than 135°. Also, as noted, in other embodiments the seam 20 may extend substantially vertically (i.e. from top nearer the windshield to bottom nearer the floor pan) in which case the instrument panel cover assembly 10 separates into left and right portions.

Retainer panel 30 is configured to attach or otherwise retain, either directly or indirectly (e.g. with fasteners), the instrument panel cover assembly 10 to another member of the vehicle, such as the vehicle body or an instrument panel cross-car beam, and is sufficiently rigid to be self-supporting upon installation and with use in the vehicle.

Retainer panel 30 is preferably formed by thermoplastic injection molding. However, any suitable forming process may be used. This includes, but is not limited to, all forms of injection molding (e.g. high pressure, low pressure injection molding, injection compression, stamping, coining, gas-assist), compression molding, reaction injection molding, blow molding, and thermoforming.

Preferably, the retainer panel 30 is formed using a thermoplastic polymer composition of PC and ABS (polycarbonate/acrylonitrile-butadiene-styrene), and more preferably, Cycoloy® IP1000 from General Electric Company. However, any suitable polymer material may be used, either thermoplastic or thermoset, natural or synthetic. This includes, but is not limited to, polymer materials containing polyolefins (e.g. polyethylene, polypropylene), polystyrene, polyurethane, vinyl, and rubber.

Preferably the polymer material for retainer panel 30 has a flexural modulus as measured in accordance with ASTM (America Society for Testing and Materials) Test Method D-790 of at least 150,000 psi (pounds per square inch) at 73° Fahrenheit in order for retainer panel 30 to provide rigidity for an instrument panel cover assembly 10. However, for other applications, the flexural modulus may be lower. According to published data, the Cycoloy® IP1000 PC/ABS from General Electric Company identified above has a flexural modulus of about 328,000 psi. In light of this, it should be understood that the flexural modulus of the material for retainer panel 30 as used for instrument panel cover assembly 10 may preferably occur anywhere between 150,000 psi. to 328,000 psi. (e.g. 200,000 psi., 250,000 psi., 300,000 psi.).

In addition to providing sufficient rigidity for retainer panel 30 of instrument panel cover assembly 10, the material for retainer panel 30 should also preferably provide heat resistance. Preferably the polymer material for retainer panel 30 has a heat distortion temperature as measured in accordance with ASTM Test Method D-648 of at least 180° Fahrenheit at 264 psi. However, for other applications, the heat distortion temperature may be lower. According to published data, the Cycoloy® IP1000 PC/ABS from General Electric Company identified above has a heat distortion temperature of 230° Fahrenheit at 264 psi., for 0.125" thick, unannealed test specimens. In light of this, it should be understood that the heat distortion temperature of the material for retainer panel 30 as used for instrument panel cover assembly 10 preferably occurs anywhere between 180° to 230° Fahrenheit (e.g. 190°, 200°, 210°, 220°).

Preferably the portions of the retainer panel 30 separated by and adjacent the seam 20 are integrally formed with the retainer panel 30. In other words, at the same time (i.e. during the same forming or molding cycle) and from the same material. Even more preferably, the seam 20 is also integrally formed with the retainer panel 30.

Seam 20 may comprise an area of reduced thickness in retainer panel 20 when compared to the nominal thickness of the retainer panel 30. As shown in FIGS. 2, the area of reduced thickness may be formed adjacent a notch 22 (as shown, notch 22 is V-shaped) extending from the inner surface 38 of the retainer panel 30 towards the outer surface 36 of the retainer panel 30. As used herein, it is to be understood that the terms inner, outer, rearward, and forward are related to the relative positions of the assembly components as installed in a vehicle.

The seam 20 may also be used in conjunction with a styling line 16 which is visible to vehicle occupants. Use of the seam 20 in conjunction with a styling line 16 may be desirable to obscure the presence of the seam 20 as compared to where the case where the styling line 16 is not used. Such may be necessary where the presence of the seam 20 is undesirably detectable by vehicle occupants from the outer surface 38 of the retainer panel 30. For example, the location of the seam 20 may "read through" or otherwise be slightly visible on the outer surface 38 of the retainer panel 30 to vehicle occupants as a result of the injection molding processes.

Styling line 16 includes, but is not limited to, break lines; edge lines; real or imitation stitch lines; real or imitation seam lines; styling grooves or other types of indentations. As shown in FIG. 2, styling line 16 comprises a styling groove 17. As in FIG. 2, where the seam 20 is used in conjunction with a styling line 16 in the form of a styling groove 17, preferably the seam 20 is disposed within the confines, and more preferably along the base-wall of (as opposed to a side-wall), the styling groove 17.

Figure 2A:
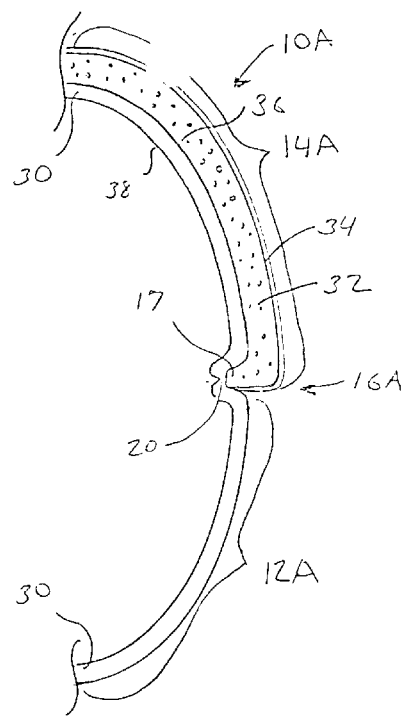

FIG. 2A is a representative profile view of a second embodiment of the instrument panel cover assembly at 10A. The instrument panel cover assembly 10A comprises retainer panel 30 with a foam layer 32 disposed over a portion of outer surface 36 of retainer panel 30 and a flexible cover layer 34 disposed over the outer surface of the foam layer 32. As shown, foam layer 32 and cover layer 34 are disposed over the upper portion 14A of the instrument panel cover assembly 10A. In this manner, the foam layer 32 may be used to cushion a head impact of a vehicle occupant in response to a vehicle collision. However, alternatively foam layer 32 and cover layer 34 could be disposed only over the lower portion 12A of the instrument panel cover assembly 10A. Consequently, in this manner, the foam layer 32 may be used to cushion a knee impact of a vehicle occupant in response to a vehicle collision.

As shown in FIG. 2A, when foam layer 32 and cover layer 34 are disposed over only a portion of the instrument panel cover assembly 10A, preferably, the terminal edge of the foam layer 32 and the cover layer 34 terminates adjacent the seam 20. As shown the terminal edge of the foam layer 32 and the cover layer 34 enter and terminate in styling groove 17 adjacent seam 20. Given that styling groove 17 is now concealed from the view of vehicle occupants by foam layer 32 and cover layer 34, it is noted that styling line 16A now takes on the form of an edge line or break line of the cover layer 34.

With the configuration of FIG. 2A (i.e. foam layer 32 and the cover layer 34 enter and terminate in styling groove 17 adjacent seam 20), the cover layer 34 need not undergo any separation (e.g. tearing) in response to air bag deployment. This reduces the cost of having to weaken the cover layer 34 to facilitate separation as known in the art. Furthermore, the foam layer 32 may also need not undergo any separation (e.g. tearing) in response to air bag deployment.

Figure 2B:
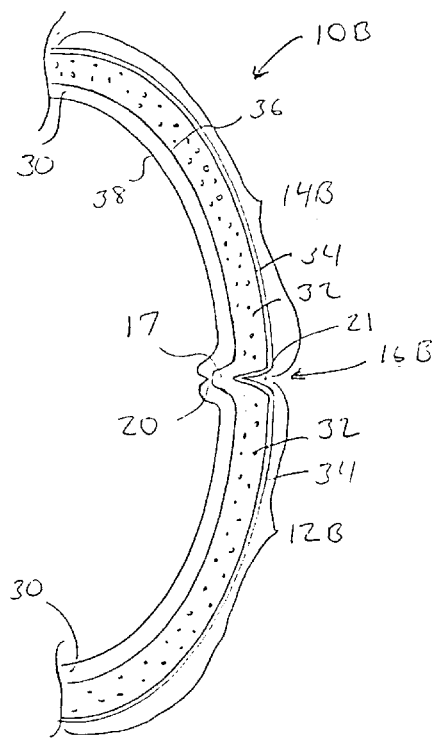

FIG. 2B is a representative profile view of a third embodiment of the instrument panel cover assembly at 10B. The instrument panel cover assembly 10B comprises a retainer panel 30 with foam layer 32 and cover layer 34 disposed over both the upper portion 14B and lower portion 14B of the instrument panel cover assembly 10B. Similar to the second embodiment, the foam layer 32 may be used to cushion a head or knee impact of a vehicle occupant on the upper portion 14B or lower portion 12B of the instrument panel cover assembly 10B, respectively.

Unlike the second embodiment shown in FIG. 2A, the terminal edge of the foam layer 32 and the cover layer 34 as shown in FIG. 2B does not terminate approximate to the seam 20. Consequently, style line 16B takes the form of a styling groove 21 in the cover layer 34. As a result, the foam layer 32 and/or the cover layer may also include respective areas of reduced thickness to facilitate separation on air bag deployment as known in the art. See for example, U.S. Pat. No. 5,447,328 to Iannazzi which is assigned to the assignee of the present invention and hereby incorporated by reference in its entirety.

The cover layer 34 and foam layer 36 may be joined to the retainer panel 30 by a foam-in-place process using reaction-injection molding as known in the art. In such a case, the cover layer 34 may be formed by any suitable forming method including, but are not limited to, slush molding, vacuum forming, thermoforming, spray coating, blow molding, rotational molding, and injection molding. Furthermore, the cover material may include any suitable cover material including, but are not limited, thermoplastics (e.g. polyvinyl chloride, polyolefins, polyurethanes, polyesters), thermoset plastics (e.g. polyurethanes), leather, and textiles. As to the foam layer 36, the foam layer may also include any suitable foam material including, but not limited to, polyurethane.

The cover layer 34 and foam layer 36 may also comprise multi-layer roll-stock or sheet-stock materials including, but not limited to, a vinyl cover layer/vinyl foam layer or a vinyl cover layer/olefin foam layer which may be vacuum formed, thermoformed, in-mold laminated, or otherwise joined to the retainer panel 30. It should be understood that for any of the retainer panels 30 disclosed herein, a foam layer 32 and/or a cover layer 34 may be disposed over a portion thereof as disclosed above.

Figure 3A:
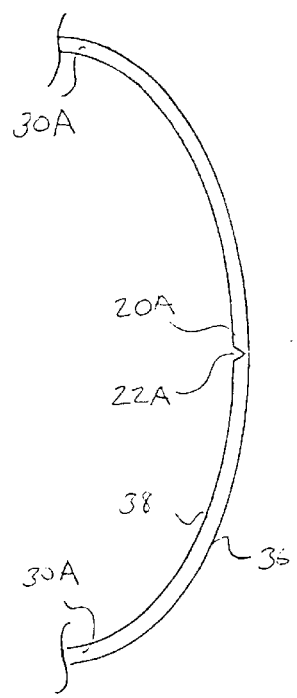
FIGS. 3A, 3B, 3C, and 3D are representative profile views of several exemplary embodiments of the seam in the instrument panel cover assembly.
Figure 3B:
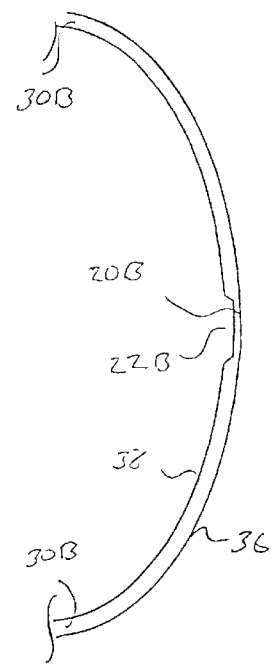
Figure 3C:
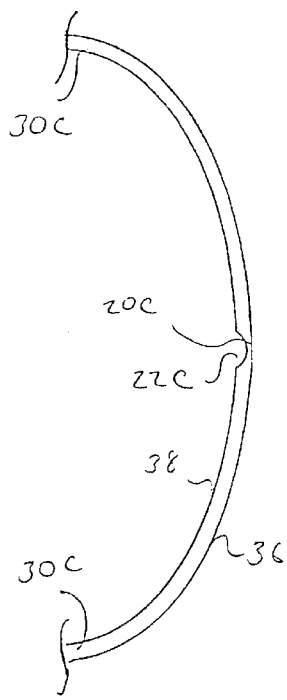

Additional exemplary embodiments of the seam 20 are illustrated in FIGS. 3A–3C. Starting with FIG. 3A, a seam 20A comprises the reduced cross-sectional thickness of the retainer panel 30A resulting when a V-shaped notch 22A is formed (e.g. molded, cut, machined, routed, pressed, stamped, etc.) into the inner surface 38 of the retainer panel 30A adjacent the seam 20A.

FIG. 3B illustrates another embodiment of the seam 20B which comprises the reduced cross-sectional thickness of the retainer panel 30B resulting when a trapezoidal or rectangular notch 22B is formed (e.g. molded, cut, machined, routed, pressed, stamped, etc.) into the rear surface 38 of the retainer panel 30B adjacent the seam 20B.

FIG. 3C illustrates another embodiment of the seam 20C which comprises the reduced cross-sectional thickness of the retainer panel 30C resulting when a semicircle notch 22C is formed (e.g. molded, cut, machined, routed, pressed, stamped, etc.) into the rear surface 38 of the retainer panel 30C adjacent the seam 20C.

Figure 3D:
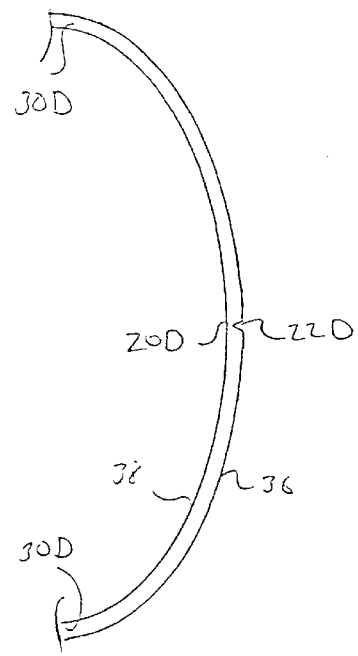

The retainer panels 30A–30C are illustrated having uninterrupted front surfaces 36 adjacent the seams 20A–20C, respectively. Consequently, the presence of the notches 22A–22C is concealed to the view of vehicle occupants. However, in still other embodiments, the notches 22A–22C may extend from the outer surface 36 towards the inner surface 38. For example, FIG. 3D illustrates a V-shaped notch 22D formed (e.g. molded, cut, machined, routed, pressed, stamped, etc) into the outer surface 38 of the retainer panel 30D. Such being the case, the notch may also function as a styling line and be visible to vehicle occupants where it is not covered by a cover layer 34 or a foam layer 36.

In addition to the above, the seam 20 may comprise one or more through-holes extending completely through the thickness of the retainer panel 30, such as having a slot shape. Such may be particularly advantageous when the retainer panel 30 is covered by a cover layer 34 or a foam layer 36 as illustrated in FIGS. 2A–2B and the seam 20 is concealed from the vehicle occupants.

Figure 4:
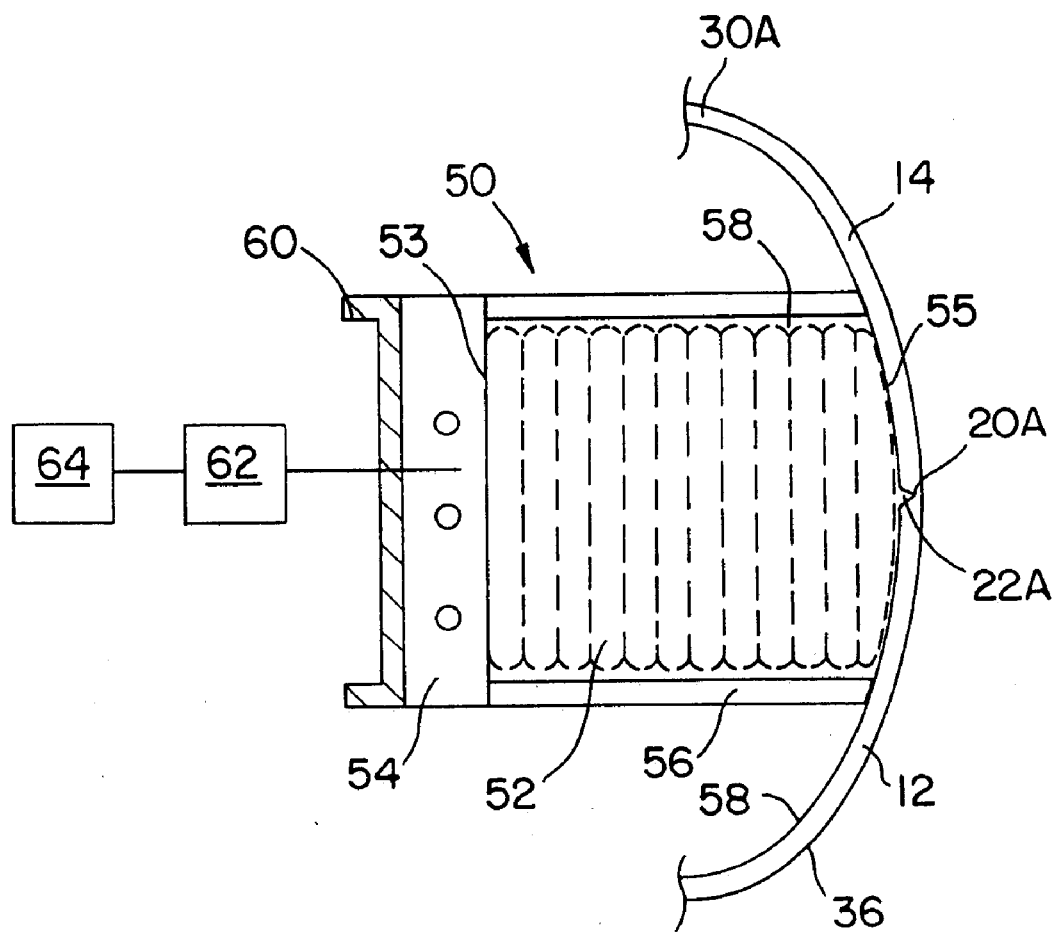
FIG. 4 is a representative profile view of an exemplary instrument panel cover assembly of with an air bag module and air bag prior to air bag deployment.
Figure 5:
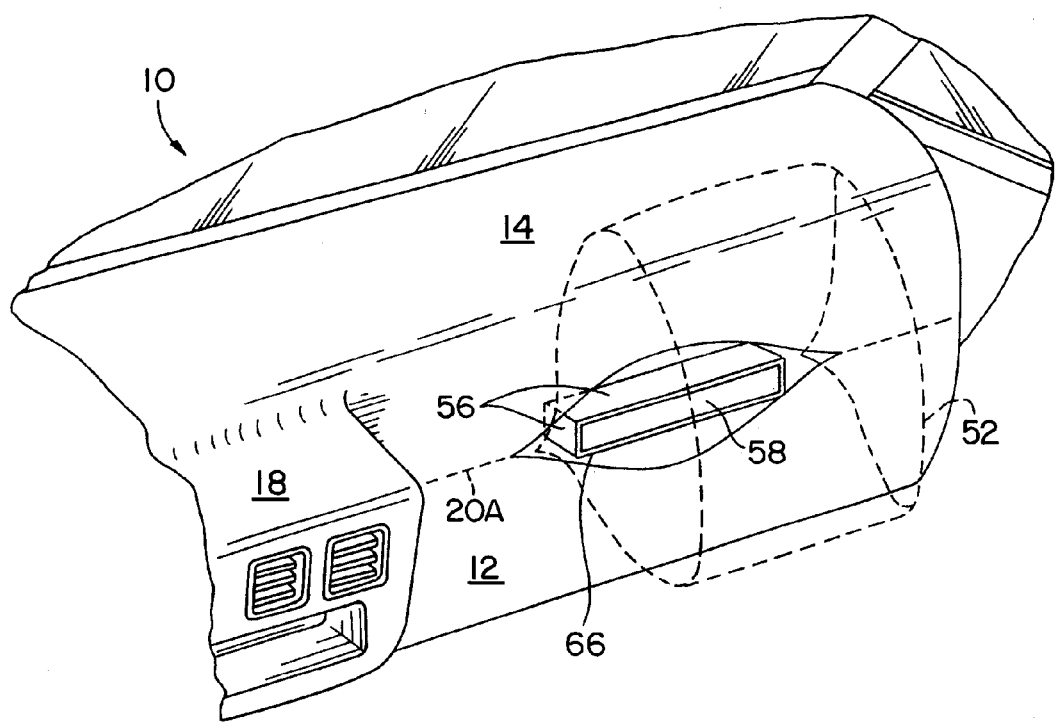
Figure 6:
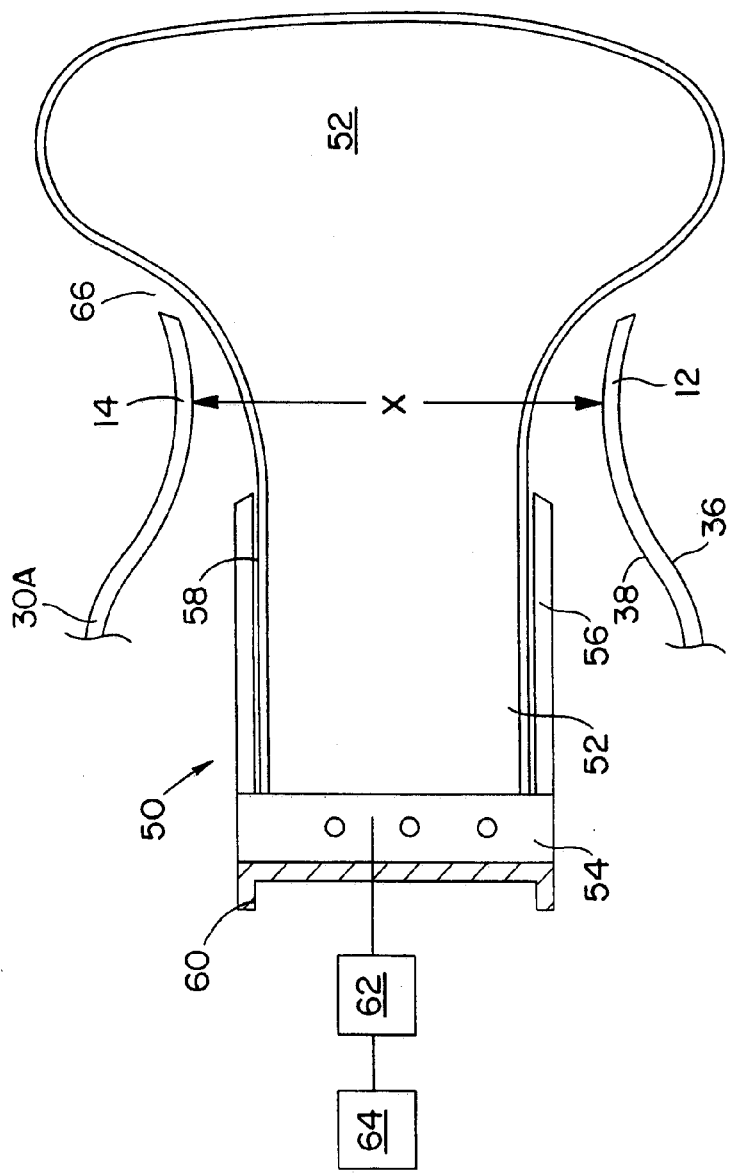
Figure 7:
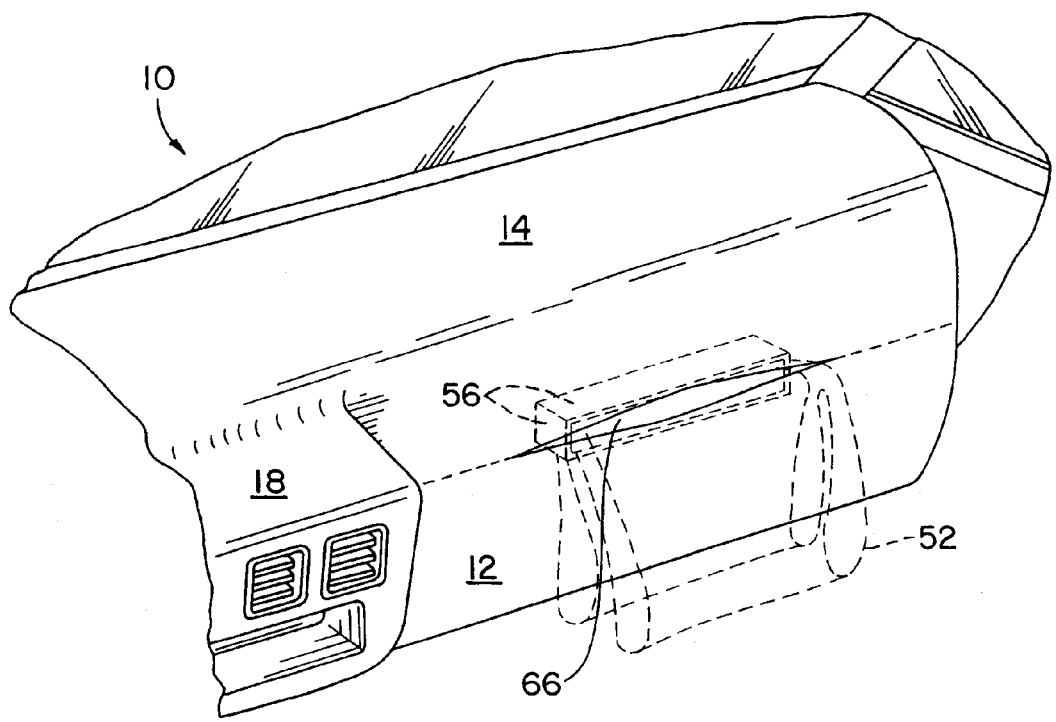
Figure 8:
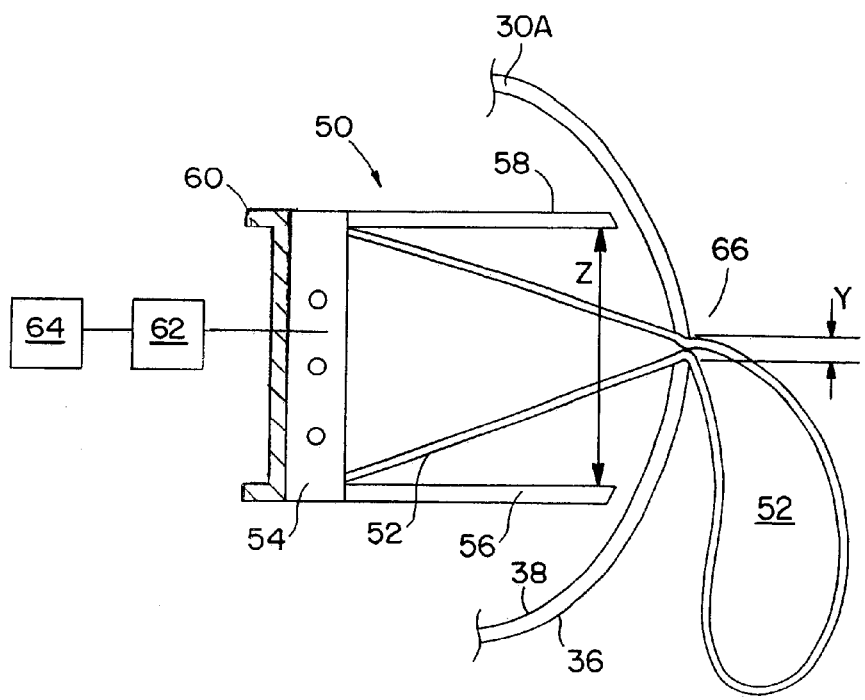
Figure 9:
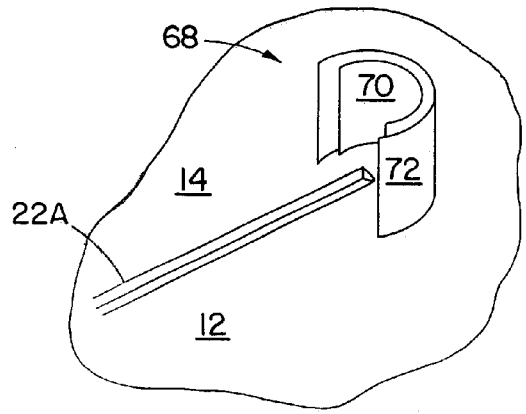

Referring to FIG. 4, there is illustrated a retainer panel 30A. The retainer panel 30A conceals an air bag module indicated at 50. Air bag module 50 includes an inflatable air bag 52, an inflator 54, and a housing 56 which provides a air bag receptacle 58 for the air bag 52 and which generally mounts to another vehicle member 60. Air bag 52 is supported in the air bag receptacle 58 of the air bag module 50 in its predeployment, deflated state and connected to the air bag module 50 at an open end 53 of the air bag 52. A closed outer end 55 of the air bag 52 is disposed adjacent the upper portion 14 and lower portion 12 of retainer panel 30A. Air bag module 50 is connected to a controller 62 as known in the art that receives a signal from a vehicle impact sensor 64 which triggers ignition of the inflator 54 to inflate the air bag 52 for deployment into the passenger space directly in front of a front-seat passenger-side vehicle occupant.

As shown in FIG. 4, air bag module assembly 50 is supported behind the upper portion 14 and a lower portion 12 of the retainer panel 30A adjacent seam 20A. The air bag module 50 is configured to direct air bag deployment along a deployment path through the seam 20A of the retainer panel 30A. The air bag deployment path being the path that the air bag will travel along as it inflates during deployment.

Upon use, air bag 52 deploys into a vehicle's passenger compartment through a deployment aperture 66 created by the retainer panel 30A. Retainer panel 30A is configured to provide the deployment aperture 66 in response to the inflating air bag 52 impacting the inner surface 38 of the retainer panel 30A which causes the seam 20A to begin to separate, and the retainer panel 30A to separate into two portions. The separating action of the seam 20A begins along the length of the line seam 20A, generally along the middle, and propagates outwards towards the ends of the seam. In this manner, deployment aperture 66 comprises an oval shape and, more specifically, an elliptical shape as shown in FIG. 5, where air bag 52 is shown inflated in phantom.

Figure 5:
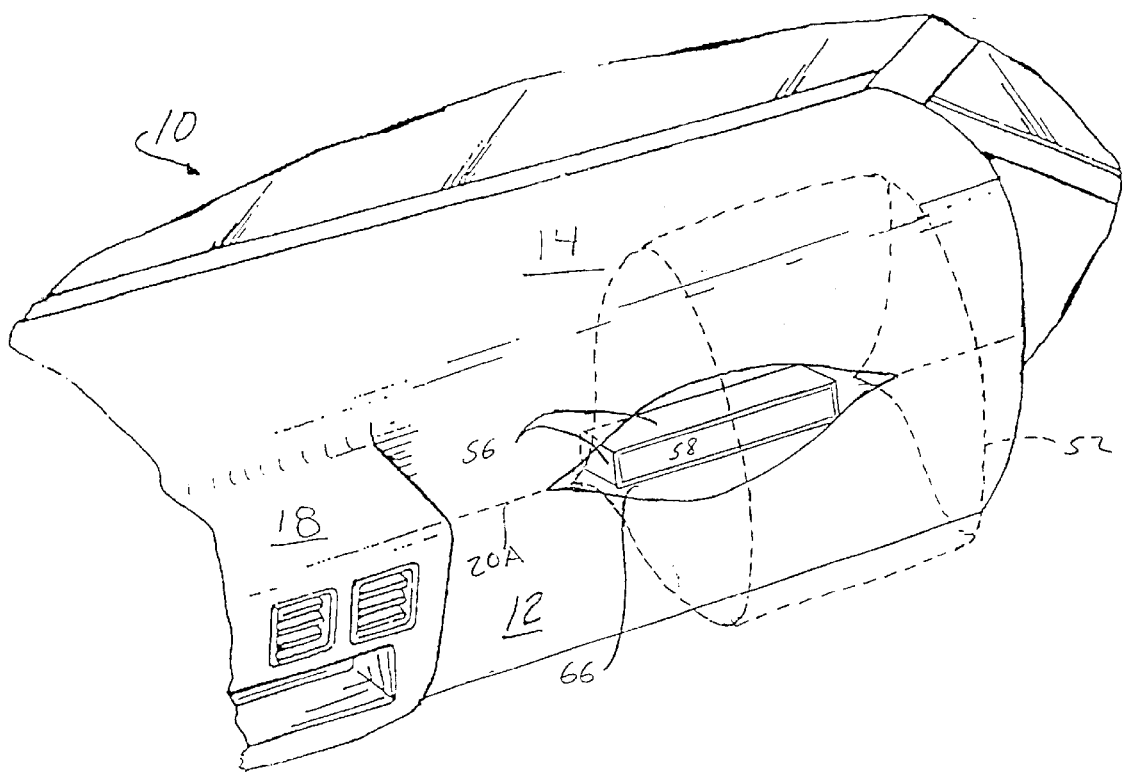
FIG. 5 is a representative perspective view of the instrument panel cover assembly of FIG. 4 during air bag deployment with the air bag inflated.
Figure 6:
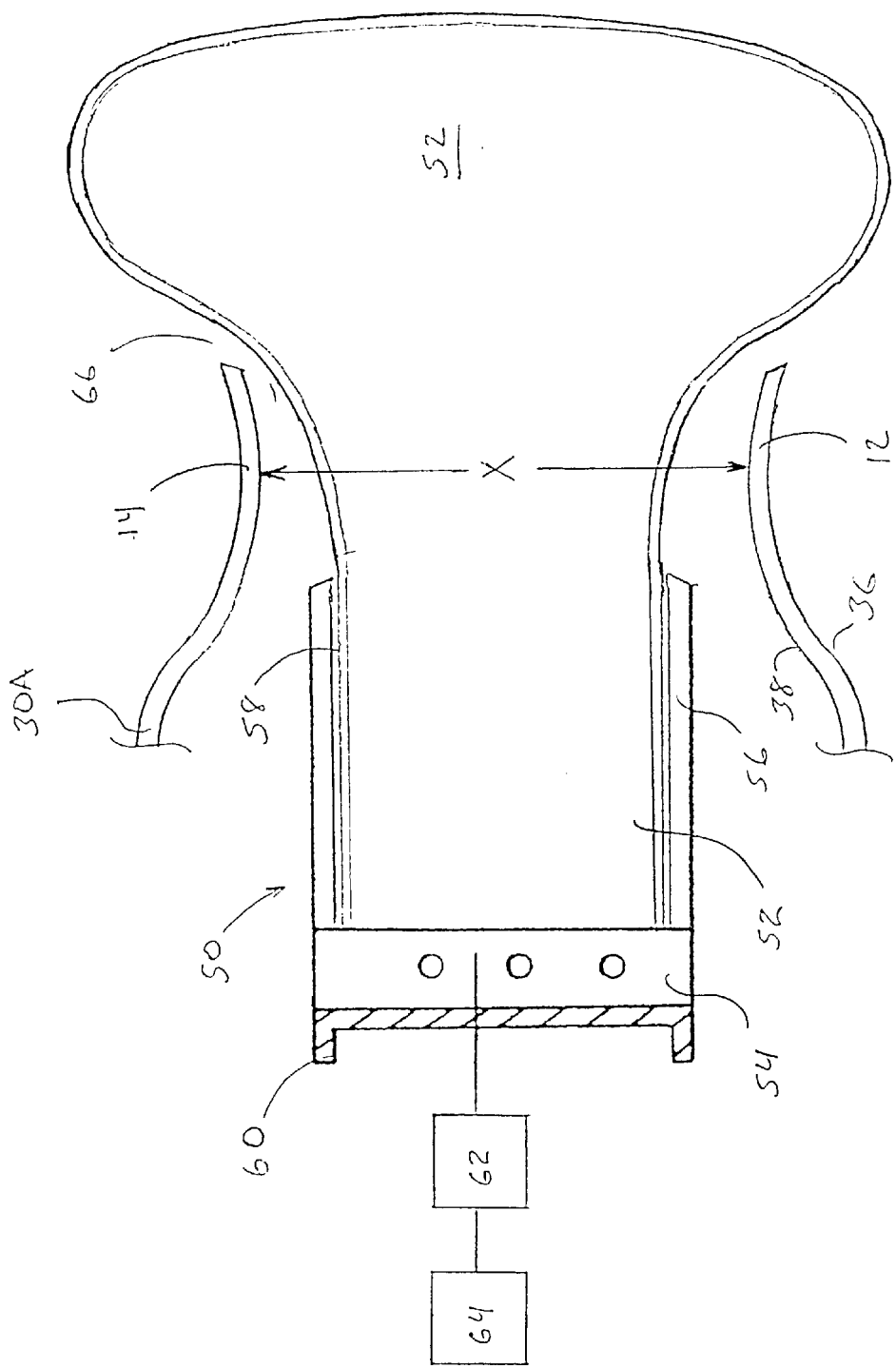
FIG. 6 is a representative profile view of the instrument panel cover assembly of FIG. 4 during air bag deployment with the air bag inflated.

FIG. 6 is representative profile view of FIG. 5 in which air bag 52 is shown in its inflated state. As shown in FIGS. 5 and 6, when air bag 52 is inflated, air bag deployment aperture 66 uncovers at least a portion of housing 56 of air bag module 50. Consequently, if the upper portion 14 and lower portion 12 of the retainer panel 30A were to remain in their fully opened positions as illustrated by FIG. 6, it is possible for a portion of a vehicle occupant's body to enter air bag deployment aperture 66 after air bag 52 has deflated and strike the housing 56 of air bag module 50. Such an event may occur in response to the vehicle undergoing a second impact after air bag 52 has deployed and deflated.

A fraction of a second after air bag 52 is inflated, it begins to deflate in a manner well known in the art. In order to protect the vehicle occupant from impacting the portions of housing 56 of air bag module 50 which were uncovered during inflation of air bag 52, the upper portion 14 and lower portion 12 of the retainer panel 30A begin to close back towards their pre-deployment positions thus closing air bag deployment aperture 66 and covering the portions of housing 56 previously uncovered. Upper portion 14 and lower portion 12 of the retainer panel 30A typically begin to close immediately after the maximum deployment force placed on retainer panel 30A during inflation of the air bag 52 has occurred. Since the maximum deployment force placed on retainer panel 30A during inflation of the air bag 52 typically occurs before full inflation of the air bag 52, upper portion 14 and lower portion 12 of the retainer panel 30A typically begin to close before full inflation of air bag 52.

Figure 7:
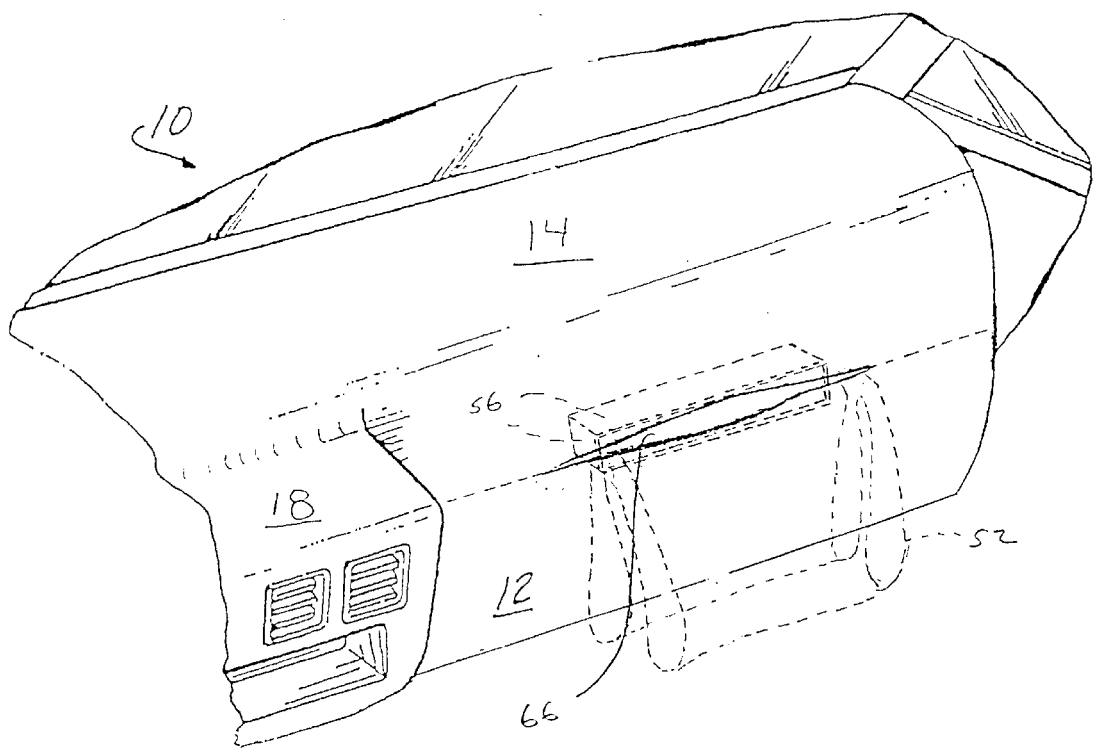
FIG. 7 is a representative perspective view of the instrument panel cover assembly of FIG. 4 after air bag deployment with the air bag deflated.
Figure 8:
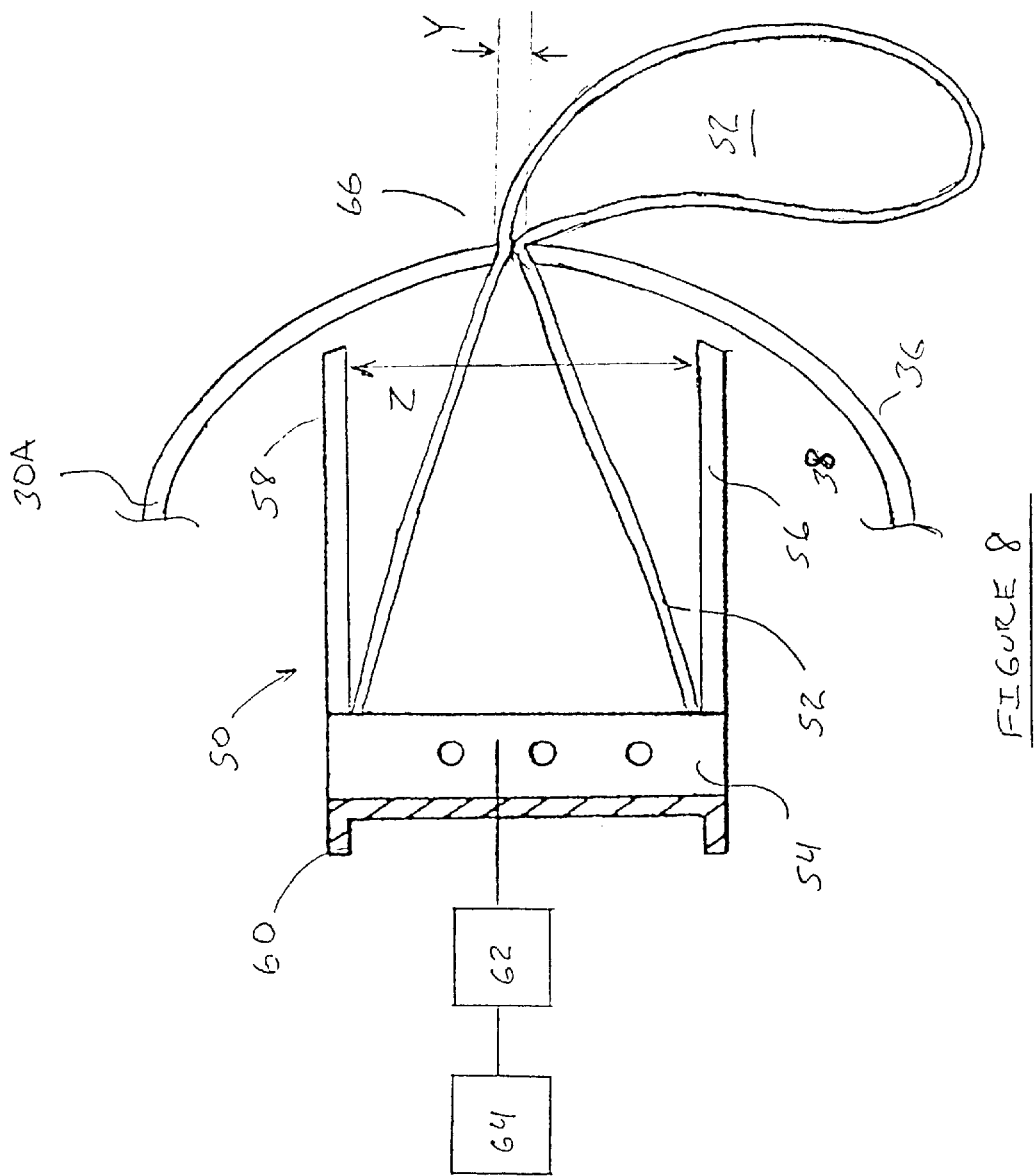
FIG. 8 is a representative profile view of the instrument panel cover assembly of FIG. 4 after air bag deployment with the air bag deflated.

As shown in FIGS. 7 and 8, upper portion 14 and lower portion 12 of the retainer panel close around air bag 52 as compared to FIGS. 5 and 6 to make the housing 56 of the air bag module 50 more difficult to contact by a vehicle occupant after deployment of air bag 52. Preferably, upper portion 14 and lower portion 12 of the retainer panel close around air bag 52 from their fully opened positions as to conceal at least a portion, and more preferably a substantial portion, of the housing 56 exposed when upper portion 14 and lower portion 12 of the retainer panel close around air bag 52 are in their fully deployed positions.

Referring to FIG. 6, the minimum distance between the upper portion 14 and the lower portion 12 of the retainer panel when air bag 52 is inflated and upper portion 14 and the lower portion 12 of the retainer panel are in their fully opened positions is denoted by the distance X. As shown in FIG. 8, the distance between opposing side walls of the housing 56 is denoted by distance Z. When upper portion 14 and lower portion 12 of the retainer panel 30A begin to close, generally a vehicle occupant is protected from striking the housing 56 when the distance X is equal to Z. Here, the distance between the upper portion 14 and the lower portion 12 of the retainer panel preferably closes approximately 33% in order for such to occur. However, the distance between the upper portion 14 and the lower portion 12 of the retainer panel continues to close until the they are separated only by the thickness of the air bag 52 as denoted by the distance Y In this manner, upper portion 14 and lower portion 12 close to about 99% of their pre-deployment positions. However, it should be appreciated that the closure of the upper portion 14 and lower portion 12 at any percentage increment between 33% and 99% will make the housing 56 of the air bag module 50 more difficult to contact by a vehicle occupant after deployment of air bag 52.

In the above manner, deployment aperture 66 has a first cross-sectional area before deployment of the air bag 52, a second cross-sectional area when the air bag 52 is inflated, and a third cross-sectional area when the air bag 52 is deflated after being inflated. The upper portion 14 and lower portion 12 of the retainer panel 30A adjacent the air bag escape seam 20A separate along the seam 20A when the retainer panel 30A is impacted by the inflating air bag 52 to increase the cross-sectional area of the aperture 66 during inflation of the air bag 52 and thereafter close to at least partially decrease the cross-sectional area of the aperture 66 after the air bag 52 has at least partially passed through the aperture 66.

The first cross-sectional area of aperture 66 is preferably equal to zero (e.g. as in the case where seam 20A is frangible and comprises no through-hole), but may have some positive value greater than zero (i.e. as in the case where the seam 20A comprises a through hole, such as a slot). An exemplary first cross-sectional area of aperture 66 in the case where the seam comprises a through hole, such as a slot, is about 1 in$^2$ (square inches) where the seam is about 18 inches in length and has a width of about 0.060 inches.

An exemplary view of the second cross-sectional area of aperture 66 is shown in FIG. 5. The first cross-sectional area of aperture 66 is less than the second cross-sectional area of aperture 66. An exemplary second cross-sectional area of aperture 66 is about 40 in$^2$ where the opened seam 20A is about 18 inches in length and about 4 inches in width at its maximum point, and tapered at sides, as shown in FIG. 5.

An exemplary view of the third cross-sectional area of aperture 66 is shown in FIG. 7. The third cross-sectional area of aperture 66 is also less than the second cross-sectional area of aperture 66. An exemplary second cross-sectional area of aperture 66 is about 1–3 in$^2$, preferably 1–2 in$^2$, and more preferably 1.5–2 in$^2$, where the seam 20A is about 18 inches in length and separated only by the thickness of the air bag 52 after deployment.

Figure 9:
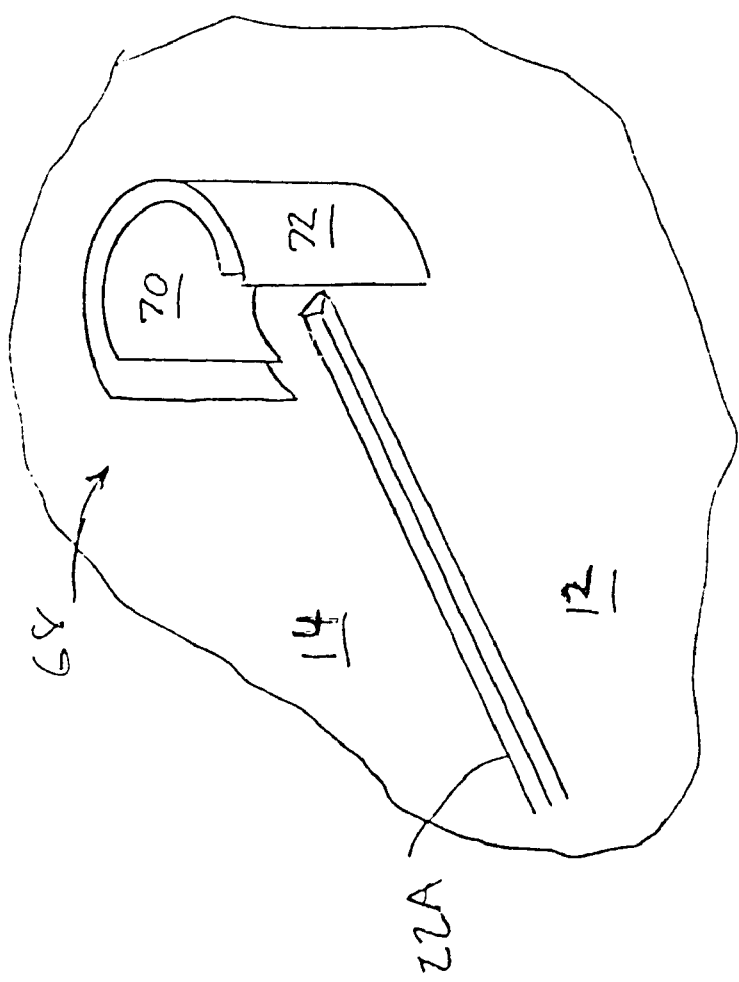
FIG. 9 is exemplary embodiment of a tear stops.

FIG. 9 illustrates an exemplary tear stop 68 which may be located adjacent each end of the seam 20A. The tear stop 68 is configured to stop the separating action of the retainer panel 30A occurring along the seam 20A should the separating action seek to extend past the end of the seam 20A. As shown tear stop 68 comprises two semi-circular ribs indicated at 70 and 72 with seam 20A directed into the confines of the semi-circles. As used herein, the term "semi-circle" means less than a complete circle. Also, any number of semi-circular ribs or any other suitable design may be used as a tear stop, such as a localized thickening or gap (hole or opening) in the retainer panel.

While not being bound to a particular theory, upper portion 14 and lower portion 12 of retainer panel 30A may be configured to operate substantially within the elastic limit, of the retainer panel material. Consequently, in response to air bag deployment, the upper portion 14 and lower portion 12 of the retainer panel will be configured to undergo primarily elastic deformation in response to the deployment force placed on retainer panel 30A during inflation of the air bag 52 and elastic recovery thereafter. The upper portion 14 and lower portion 12 of the retainer panel 30A elastically deform outwards to increase the cross-sectional area of the aperture 66 and elastically recover inwards to decrease the cross-sectional area of the aperture 66. Accordingly, the upper portion 14 and lower portion 12 operate in such fashion, while avoiding catastrophic fracture and zero recovery to provide the novel design herein.

Thus, it is seen that the invention provides a vehicle trim member providing an air bag deployment aperture that does not require to be covered by a separately attached air bag deployment door. The invention also provides a vehicle trim member which does not require complicated hardware and offers a more simplistic design. Additionally, the invention also provides a trim member providing an air bag deployment aperture which closes after air bag deployment to protect the passenger-side occupant from striking the internal components of the air bag module after air bag deployment, for example, in response to a second vehicle impact.

The description and drawings illustratively set forth our presently preferred invention embodiments. We intend the description and drawings to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

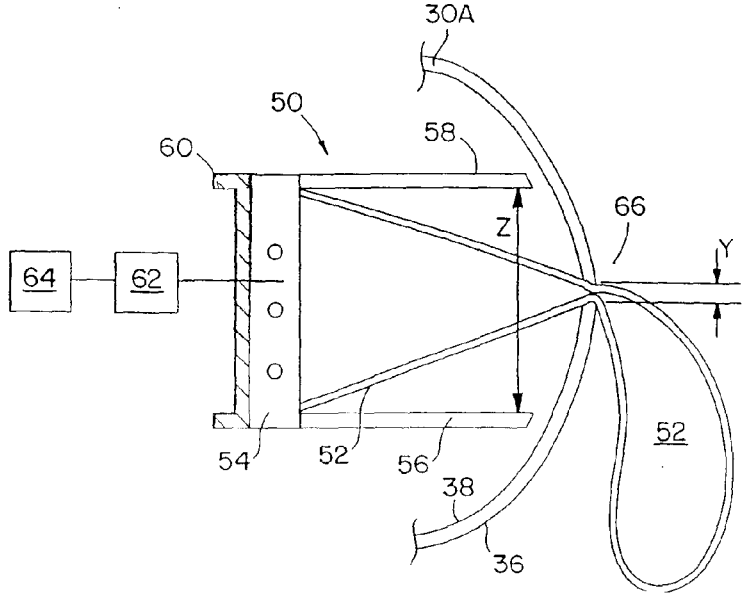

We claim:

1. An air bag cover assembly, the cover assembly comprising:
    a self-supporting retainer panel having an aperture formed by separation along an air bag escape seam of said retainer panel during the deployment of an inflatable air bag for the air bag to pass through;
    the aperture having a cross-sectional area during air bag inflation greater than the cross-sectional area of the aperture when the air bag is deflated after being inflated, wherein the retainer panel comprises a polymer material having a flexural modulus at 73 degrees F. of at least 150,000 psi and a heat distortion temperature of at least 180 degrees F. at 264 psi.

2. The air bag cover assembly of claim 1 wherein the retainer panel is an instrument panel cover assembly.

3. The air bag cover assembly of claim 1 wherein the aperture comprises an oval shape.

4. The air bag cover assembly of claim 3 wherein the oval aperture further comprises an elliptical shape.

5. The air bag cover assembly of claim 1, wherein the polymer material comprises a composition of polycarbonate and acrylonitrile-butadiene-styrene.

6. The air bag cover assembly of claim 1 wherein the polymer material has a flexural modulus at 73° Fahrenheit of at least 150,000 psi.

7. The air bag cover assembly of claim 1 wherein the polymer material has a flexural modulus at 73° Fahrenheit of at least 200,000 psi.

8. The air bag cover assembly of claim 1 wherein the polymer material has a flexural modulus at 73° Fahrenheit of at least 250,000 psi.

9. The air bag cover assembly of claim 1 wherein the polymer material has a flexural modulus at 73° Fahrenheit of at least 300,000 psi.

10. The air bag cover assembly of claim 1 wherein the air bag escape seam is frangible.

11. The air bag cover assembly of claim 1 wherein the air bag escape seam comprises a single line.

12. The air bag cover assembly of claim 11 wherein the line is straight.

13. The air bag cover assembly of claim 11 wherein the line is curved.

14. The air bag cover assembly of claim 1 wherein the air bag escape seam comprises an area of reduced thickness in the retainer panel.

15. The air bag cover assembly of claim 14 wherein the area of reduced thickness in the retainer panel is formed adjacent a notch in the retainer panel.

16. The air bag cover assembly of claim 15 wherein the notch in the retainer panel comprises a V-shape.

17. The air bag cover assembly of claim 1 wherein the air bag escape seam comprises at least one through-hole in the retainer panel.

18. The air bag cover assembly of claim 17 wherein the through-hole comprises a slot shape.

19. The air bag cover assembly of claim 1 wherein the air bag escape seam is obscured from view to vehicle occupants.

20. The air bag cover assembly of claim 1 wherein the air bag escape seam extends substantially horizontally across the retainer panel and does not contain a vertical air bag escape seam.

21. The air bag cover assembly of claim 1 wherein the air bag escape seam extends substantially vertically with respect to the retainer panel.

22. The air bag cover assembly of claim 1 wherein at least a portion of the retainer panel is covered by a foam material.

23. The air bag cover assembly of claim 22 wherein at least a portion of the foam is covered by a flexible cover layer.

24. The air bag cover assembly of claim 1 wherein the retainer panel comprises first and second portions adjacent the air bag escape seam.

25. The air bag cover assembly of claim 24 wherein the first and second portions of the retainer panel adjacent the air bag escape seam separate along the seam when the retainer panel is impacted by the inflating air bag to increase the cross-sectional area of the aperture during inflation of the air bag and thereafter close to at least partially decrease the cross-sectional area of the aperture after the air bag has at least partially passed through the aperture.

26. An air bag cover assembly, the cover assembly comprising:
    a self-supporting retainer panel for an instrument panel cover assembly, the retainer panel having an air bag escape seam formed therein, the air bag escape seam forming an aperture by separation of the retainer panel during deployment of an inflatable air bag, the aperture having a cross-sectional area during air bag inflation greater than the cross-sectional area of the aperture when the air bag is deflated, wherein the retainer panel comprises a polymer material having a flexural modulus at 73 degrees F. of at least 150,000 psi and a heat distortion temperature of at least 180 degrees F. at 264 psi.

27. The air bag cover assembly of claim 26 wherein the retainer panel comprises upper and lower portions adjacent the air bag escape seam.

28. The air bag cover assembly of claim 27 wherein the upper portion of the retainer panel is configured to receive the force of a head impact of the front-seat passenger-side occupant.

29. The air bag cover assembly of claim 27 wherein the lower portion of the retainer panel is configured to receive the force of a knee impact of the front-seat passenger-side occupant.

30. The air bag cover assembly of claim 26 wherein the air bag escape seam is frangible.

31. The air bag cover assembly of claim 26 wherein the air bag escape seam comprises an area of reduced thickness in the retainer panel.

32. The air bag cover assembly of claim 26 wherein the air bag escape seam is obscured from view to vehicle occupants.

33. The air bag cover assembly of claim 26 wherein at least a portion of the retainer panel is covered by a foam material.

34. The air bag cover assembly of claim 26 wherein at least a portion of the foam is covered by a flexible cover layer.

35. A method of providing an air bag deployment aperture for an air bag cover assembly, the method comprising:

providing a self-supporting retainer panel;

forming an aperture in the retainer panel by separation of the retainer panel along an air bag escape seam for the deployment of an inflating air bag, increasing the cross-sectional area of the aperture during inflation of the air bag, and decreasing the cross-sectional area of the aperture after the air bag partially passes through the aperture, wherein the retainer panel comprises a polymer material having a flexural modulus at 73 degrees F. of at least 150,000 psi and a heat distortion temperature of at least 180 degrees F. at 264 psi.

36. The method providing an air bag deployment aperture for an air bag cover assembly of claim 35 wherein:

the step of increasing the cross-sectional area of the aperture during inflation of the air bag also includes uncovering at least a portion of an air bag module, and the step of decreasing the cross-sectional area of the aperture after the air bag has at least partially passed through the aperture includes covering an uncovered portion of the air bag module with the retainer panel.

37. The method of providing an air bag deployment aperture for an air bag cover assembly of claim 35 wherein:

the retainer panel comprises first and second portions adjacent an air bag escape seam, and the step of increasing the cross-sectional area of the aperture during inflation of the air bag includes separating the first and second portions of the retainer panel along the seam, and the step of decreasing the cross-sectional area of the aperture after the air bag has at least partially passed through the aperture includes at least partially closing the first and second portions of the retainer panel.

* * * * *

UNITED STATES PATENT AND TRADEMARK OFFICE
CERTIFICATE OF CORRECTION

PATENT NO.    : 6,655,711 B1
DATED         : December 2, 2003
INVENTOR(S)   : Craig B. Labrie et al.

It is certified that error appears in the above-identified patent and that said Letters Patent is hereby corrected as shown below:

The title page should be deleted and substitute therefore the attached title page.

Attached, are replacement sheets 1 through 8 of the drawings (figs. 1 through 9) as shown on the attached pages.

Signed and Sealed this

Sixth Day of April, 2004

JON W. DUDAS
*Acting Director of the United States Patent and Trademark Office*

(12) United States Patent
Labrie et al.

(10) Patent No.: US 6,655,711 B1
(45) Date of Patent: Dec. 2, 2003

(54) AIR BAG COVER ASSEMBLY

(75) Inventors: Craig B. Labrie, Dover, NH (US); John D. Gray, Union, NH (US)

(73) Assignee: Textron Automotive Company, Inc., Troy, MI (US)

(*) Notice: Subject to any disclaimer, the term of this patent is extended or adjusted under 35 U.S.C. 154(b) by 0 days.

(21) Appl. No.: 09/699,263

(22) Filed: Oct. 27, 2000

(51) Int. Cl.⁷ .............................................. B60R 21/20
(52) U.S. Cl. ................... 280/728.3; 280/730.2; 280/732
(58) Field of Search .................... 280/728.3, 732, 280/730.2

(56) References Cited

U.S. PATENT DOCUMENTS

| | | | |
|---|---|---|---|
| 2,818,933 A | 1/1958 | Tell | 180/90 |
| 3,817,552 A | 6/1974 | Knight, IV et al. | 280/150 |
| 5,066,037 A | 11/1991 | Castrigno et al. | 280/732 |
| 5,082,310 A | 1/1992 | Bauer | 280/732 |
| 5,333,901 A | 8/1994 | Barnes | 280/732 |
| 5,335,935 A * | 8/1994 | Proos et al. | 280/728.3 |
| 5,431,435 A | 7/1995 | Wilson | 280/728.3 |
| 5,542,696 A * | 8/1996 | Steffens et al. | 280/730.1 |
| 5,603,524 A | 2/1997 | Barnes et al. | 280/728.2 |
| 5,647,608 A * | 7/1997 | Damman et al. | 280/728.2 |
| 5,755,460 A | 5/1998 | Barnes et al. | 280/728.3 |
| 5,783,016 A | 7/1998 | Gallagher et al. | 156/214 |
| 5,967,546 A * | 10/1999 | Homier et al. | 280/730.2 |
| 6,254,122 B1 * | 7/2001 | Wu et al. | 280/728.3 |

* cited by examiner

Primary Examiner—Paul N. Dickson
Assistant Examiner—Deanna Draper
(74) Attorney, Agent, or Firm—Grossman, Tucker, Perreault & Pfleger, PLLC

(57) ABSTRACT

An air bag cover assembly is provided comprising a retainer panel having an aperture during the deployment of an inflatable air bag for the airbag to pass through. The aperture has a cross-sectional area during air bag inflation greater than the cross-sectional area of the aperture when the air bag is deflated after being inflated. A method of providing an air bag deployment aperture for an air bag cover assembly is also provided. The method comprises providing a retainer panel, forming an aperture in the retainer panel for the deployment of an inflating air bag from an air bag module, increasing the cross-sectional area of the aperture during inflation of the air bag, and decreasing the cross-sectional area of the aperture after the air bag has at least partially passed through the aperture.

37 Claims, 9 Drawing Sheets